United States Patent [19]

Petty

[11] 3,998,393
[45] Dec. 21, 1976

[54] SUPERSONIC DIFFUSER

[75] Inventor: James S. Petty, Greene County, Ohio

[73] Assignee: The United States of America as represented by the Secretary of the Air Force, Washington, D.C.

[22] Filed: Jan. 20, 1976

[21] Appl. No.: 650,591

[52] U.S. Cl. .......................... 239/553.5; 239/562; 239/590.5; 331/94.5 G
[51] Int. Cl.² ...................... H01S 3/03; B05B 1/14; B05B 1/30
[58] Field of Search ............... 239/DIG. 7, DIG. 21, 239/265.11, 553.5, 553, 562, 265.25, 565, 265.27, 265.29, 590.5; 331/94.5 C, 94.5 G, DIG. 1; 181/33 HD

[56] References Cited

UNITED STATES PATENTS

| | | | |
|---|---|---|---|
| 2,609,240 | 9/1952 | Faulkner et al. | 239/553.5 X |
| 2,684,690 | 7/1954 | Lee | 239/590.5 X |
| 2,971,327 | 2/1961 | Moy et al. | 181/33 HD |
| 3,036,430 | 5/1962 | Eggers et al. | 181/33 HD |
| 3,560,876 | 2/1971 | Airey | 331/94.5 G |
| 3,566,297 | 2/1971 | Blackman | 331/94.5 G X |

Primary Examiner—Robert S. Ward, Jr.
Attorney, Agent, or Firm—Joseph E. Rusz; Richard J. Killoren

[57] ABSTRACT

A supersonic diffuser for use with a gas dynamic laser having a multichannel shock duct diffuser with outer duct walls and inner duct walls forming an inner duct channel and two outer duct channels. A retractable wall is provided in each of the outer duct channels for closing off the outer ducts after diffuser start up wherein the gas wedges forward of the retractable walls together with the inner duct channel provide diffuser operation essentially the same as a conventional multiple shock diffuser. Retractable stabilizer wedges are positioned slightly forward of the normal separation points.

5 Claims, 14 Drawing Figures

3,998,393

SUPERSONIC DIFFUSER

RIGHTS OF THE GOVERNMENT

The invention described herein may be manufactured and used by or for the Government of the United States for all governmental purposes without the payment of any royalty.

BACKGROUND OF THE INVENTION

High power gas dynamic lasers presently employ fixed geometry diffusers because they are relatively simple in design and construction and their pressure recovery performance is adequate. However, the improvement of the specific power output of gas dynamic lasers by increasing lasing cavity Mach number and decreasing cavity pressure requires diffuser performance beyond that obtainable from fixed geometry designs, which are limited to roughly "normal shock" recovery.

Variable geometry diffusers used in supersonic inlet designs can produce nearly isentropic pressure recovery, but they use massive boundary layer suction to prevent flow separation. This is possible because the pressures in an inlet are all above the external ambient pressure, so no pumping of the bleed flow is necessary. Furthermore, unlike the gas dynamic laser, there is no boundary layer build-up upstream of the diffuser.

In a gas dynamic laser diffuser, as in most wind tunnel diffusers, the static pressures are all below the external ambient pressure, so boundary layer bleed by suction requires the use of some kind of turbomachine or ejector pump. While this might be acceptable for a wind tunnel, the weight and volume of such pumps could be prohibitive for a mobile gas dynamic laser system. Boundary layer energization by injection is possible, but expensive in terms of the required mass flow rate of injectant.

Research on variable geometry wind tunnel diffusers has demonstrated that performance considerably better than that obtainable from fixed geometry diffusers could be obtained without any boundary layer suction or mass injection. Nearly twice normal shock recovery has been attained at Mach 3 and, in terms of normal shock recovery, even better performance has been achieved at higher Mach numbers.

In view of these results, it should be possible to design variable geometry diffusers for gas dynamic lasers which have significantly improved performance over present designs. However, because gas dynamic laser systems are to be mobile, diffuser designs for them must also have the lowest weight and volume possible, consistent with the desired pressure recovery. Rapid diffuser starting is also desirable, since no laser power can be extracted from the gas dynamic laser until steady supersonic flow is established in the laser cavity and working fluid from which no power is extracted is wasted mass.

BRIEF SUMMARY OF THE INVENTION

According to this invention, for startup, the diffuser for the gas dynamic laser is configured to form a multichannel shock duct diffuser. The performance of this configuration is about the same as that of a fixed geometry diffuser with the same effective blockage, so the supply pressure required to establish supersonic flow in the laser cavity will be about the same as present gas dynamic laser diffuser designs.

Once supersonic flow is established, gates are closed and stabilizer wedges are extended, causing an upstream flow separation which deflects the flow into the central channel of the diffuser. In this configuration, the diffuser is essentially a conventional multiple shock diffuser and performs similarly. The higher pressure recovery of the diffuser in this configuration then allows the gas dynamic laser supply pressure to be reduced to a lower operating level.

IN THE DRAWINGS

DETAILED DESCRIPTION OF THE INVENTION

Figure 1:
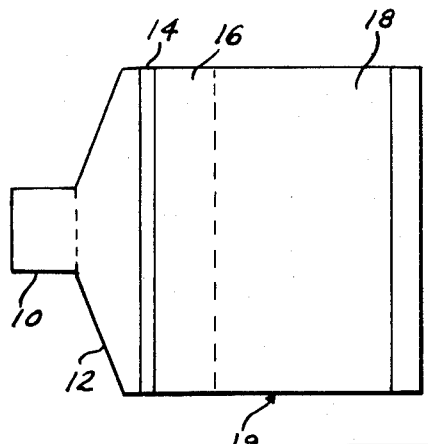
FIG. 1 is a schematic block diagram of a gas dynamic laser with a diffuser.

Reference is now made to FIG. 1 of the drawing which shows a conventional gas dynamic laser having a combustor 10, a manifold 12, a nozzle section 14, an optical cavity 16 and a diffuser section 18.

Figure 2:
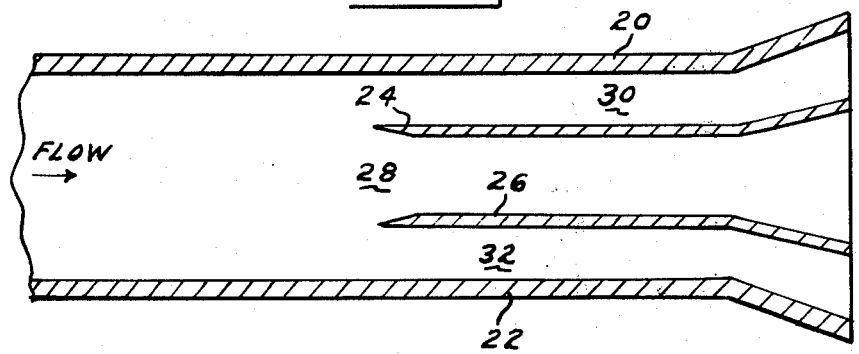
FIG. 2 is a schematic diagram of a supersonic diffuser which might be used with the device of FIG. 1.

FIG. 2 shows a conventional multichannel shock duct diffuser such as might be used with a conventional gas dynamic laser of FIG. 1. The channel shown in FIG. 2 is across the shorter dimension of the laser channel of the device of FIG. 1, that is looking into side 19. The diffuser has outer shock duct channel walls 20 and 22 with inner walls 24 and 26 forming an inner duct channel 28 and outer duct channels 30 and 32. The ducts 28, 30 and 32 would normally be divided by a plurality of vertical walls, not shown.

Figure 3:
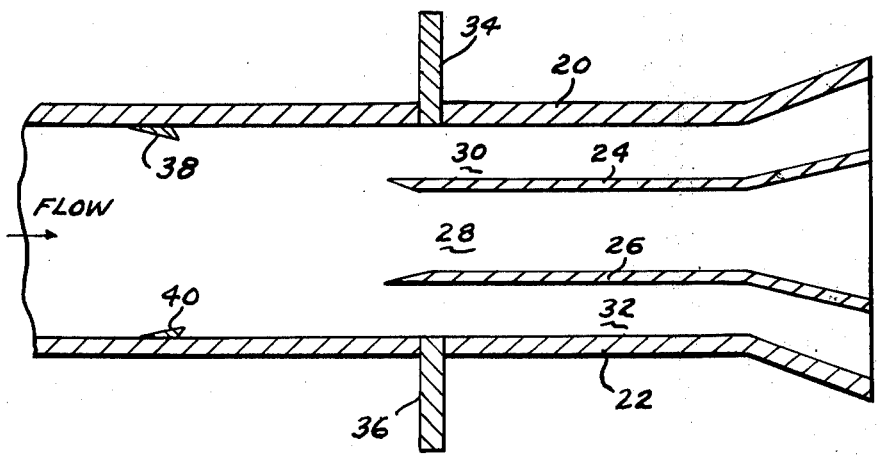
FIG. 3 shows the device of FIG. 2 modified according to this invention.
Figure 4:
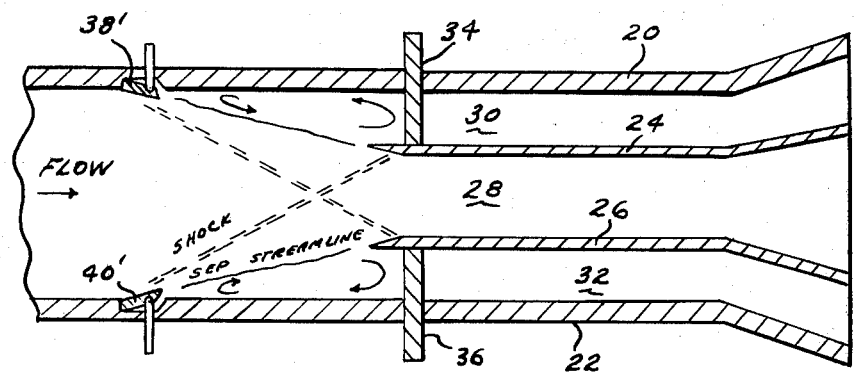
FIG. 4 shows a modification of the device of FIG. 3 with the gates closed.

According to this invention, the device of FIG. 2 is modified in the manner shown in FIG. 3. Gates 34 and 36 are provided in walls 20 and 22 and used to close channels 30 and 32, as shown in FIG. 4 after starting of the multichannel shock duct diffuser.

Stabilizer wedges 38 and 40 are provided upstream of gates 34 and 36, as will be described below.

Figure 6:
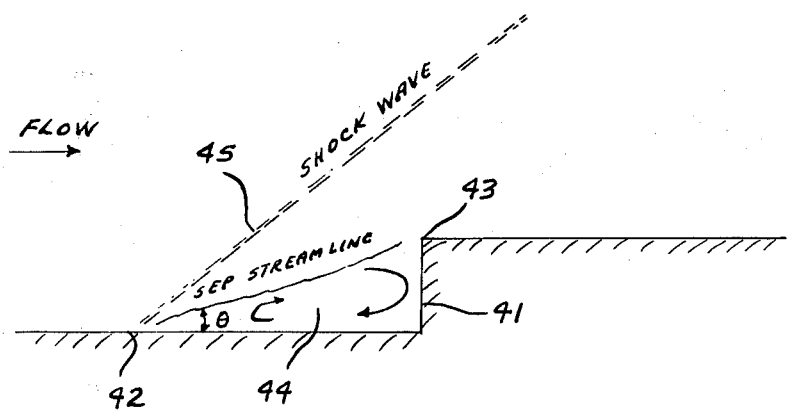
FIG. 6 is a schematic illustration showing the flow with a forward facing wall.
Figure 7:
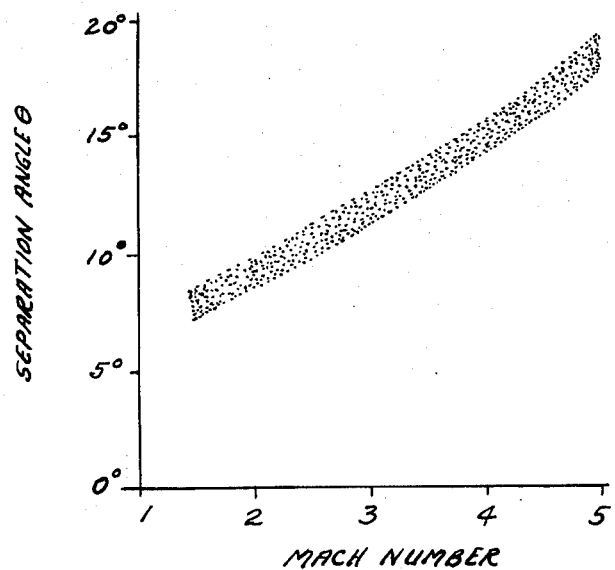
FIG. 7 shows separation angle vs Mach number for the device of FIG. 6.

The behavior of a supersonic fluid flow along a smooth wall with an upstream facing step on the wall is characterized by a large flow separation ahead of the step 41, as shown in FIG. 6. The separation streamline forms a nearly straight line from the separation point 42 to the reattachment point at the lip 43 of the step.

Figure 5:
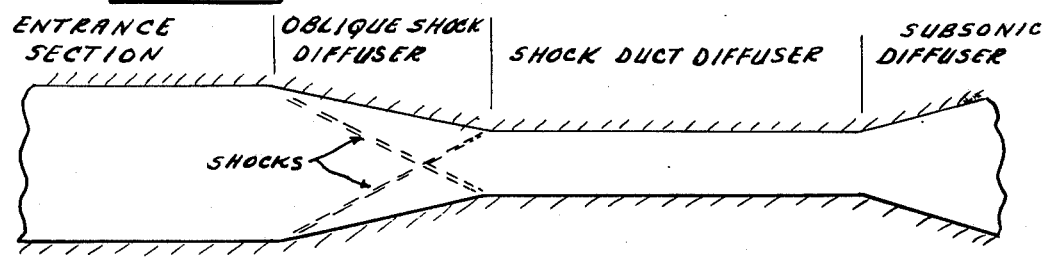
FIG. 5 shows a conventional multiple shock diffuser.

The fluid trapped between this separation streamline and the wall in region 44 has relatively low momentum and recirculates within this separated region. The static pressure in the separated flow region is nearly constant. The angle $\theta$ with which the separation streamline leaves the wall is mainly a function of the freestream Mach number, characteristic boundary layer Reynolds number and wall temperature. However, if the Reynolds number is sufficiently high and the step height to boundary layer thickness ratio is greater than 2, $\theta$ depends primarily on the Mach number. FIG. 5 is a plot of $\theta$ as a function of Mach number for this situation, as determined by experiments.

To the external inviscid flow, the separation streamline appears as a wedge-shaped surface. The flow turning at the separation point generates an oblique shock wave 45 with an attendant pressure rise. It is the interaction of the boundary layer with this shock wave that determines the separation angle.

In order to advantageously use the gas wedge phenomenon, it is necessary to ensure that the boundary layer flow is not significantly degraded by the separation and reattachment interactions. This is due to the fact that overall diffuser performance is strongly dependent on the boundary layer flow. The effects of the separation and reattachment may be minimized by ensuring that the flow is steady and it is reattached with as little disturbance as possible.

Figure 8:
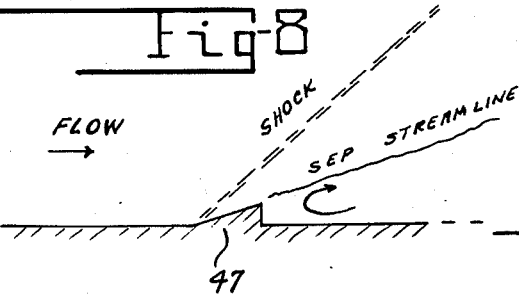
FIG. 8 is a schematic illustration showing a separation point stabilizer for the device of FIG. 3.
Figure 9:
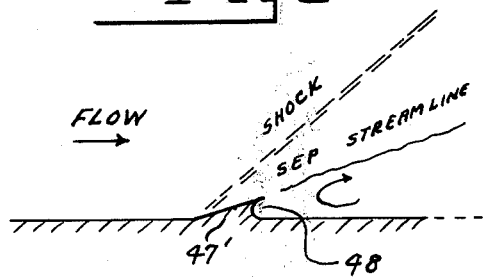
FIG. 9 shows a modification of the device of FIG. 8.

In experiments it has been found that the separation point in front of a forward-facing step is not particularly steady; it tends to jitter very rapidly back and forth a distance roughly equal to the boundary layer thickness. This "jitter" may be stopped by forcing the flow separation to take place at a particular point, as shown in FIG. 8. A small stabilizer wedge 47 is placed at the desired separation point. The wedge need be only one or two boundary layer thicknesses in length to be effective. The wedge angle is the same as the normal separation streamline angle. The flow turns along the wedge surface and separates at its rear. A cleaner separation may be obtained by undercutting the rear of the wedge 47' as shown at 48 in FIG. 9 so that the flow in the separated region is nearly parallel to the attached flow at the rear of the stabilizer wedge.

Figure 10:
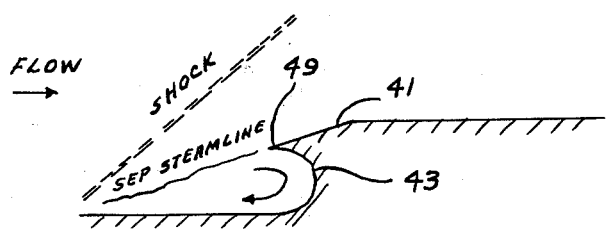
FIG. 10 is a schematic illustration showing the desired attachment point configuration for the device of FIG. 6.

The reattachment interaction may be minimized by suitably shaping the forward-facing step in the vicinity of the reattachment point. The simple forward-facing step with square corners is not suitable because experiments have shown that the separation streamline actually reattaches on the forward face near the corner. This generates a normal shock wave and an attendant strong interaction. The best reattachment configuration, as shown in FIG. 10, provides a forward-facing cusp 49. The edge of such a cusp is the only possible stable reattachment point. If the surface 41 above the cusp is cut to the angle as the separation streamline angle the underside is undercut, as shown at 43, so that the gas flow just below the separation streamline is not abruptly halted, then the reattachment interaction will be small. The depth of the undercut is very important; if it is too deep the flow will be unstable, if it is too shallow a strong reattachment interaction will occur. Experiments indicate the optimum depth is between one and two times the boundary layer thickness.

In the operation of the device, for gas dynamic laser start up, the gates 34 and 36 are positioned as in FIG. 3 and the diffuser is configured to form a multichannel shock duct diffuser. The performance of this configuration is about the same as that of a fixed geometry diffuser with the effective blockage, so that the supply pressure required to establish supersonic flow in the laser cavity is about the same as with present gas dynamic laser diffuser designs. With stationary wedges 38 and 40, as shown in FIG. 3, a slightly higher pressure will be required for start up; however, retractable wedges 38' and 40' may be provided, as shown in FIG. 4, which will make the use of higher pressures unnecessary.

After supersonic flow is established, gates 34 and 36 are closed and wedges 38' and 40' are extended, causing upstream flow separation which deflects the flow into the central channel 28 as shown schematically in FIG. 4. In this configuration, the diffuser operates essentially as a conventional multiple shock diffuser shown schematically in FIG. 5. The higher pressure recovery of the diffuser in this configuration allows the gas dynamic laser supply pressure to be reduced to a lower operating level.

Figure 11:
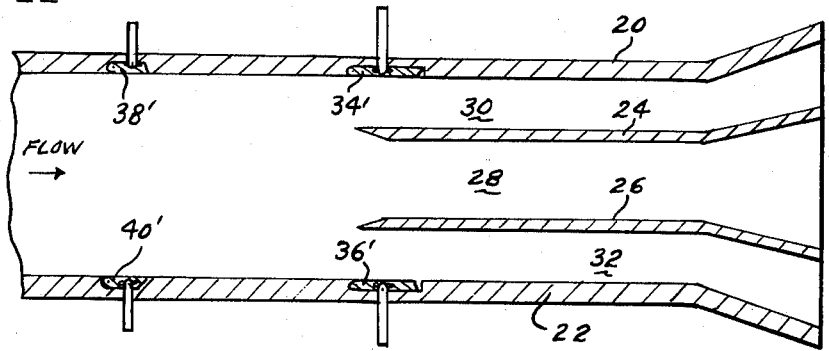
FIG. 11 shows another embodiment for the device of FIG. 3.
Figure 12:
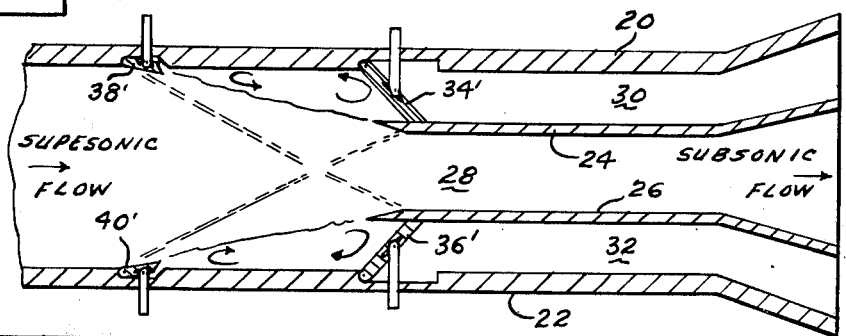
FIG. 12 shows the device of FIG. 11 with the gates closed and with the separation point stabilizers extended.

While sliding gates have been shown, movable hinge type gates 34' and 36', shown in FIGS. 11 and 12, could be provided. In the device constructed this type of gate was used. Also in the device constructed the gates and wedges were operated manually; however, automatic controls could be provided which would be controlled by pressure sensors. Improved results were obtained with the stabilizer wedge moved forward from the natural separation position and with the use of a wedge angle smaller than the natural separation angle.

Figure 13:
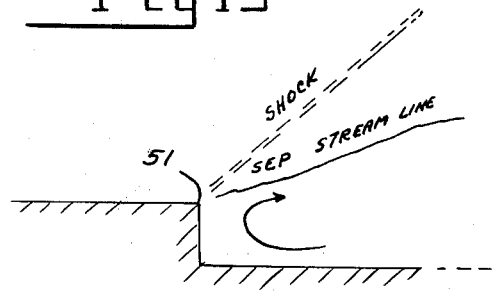
FIG. 13 is a schematic illustration showing a modification of the device of FIG. 8.
Figure 14:
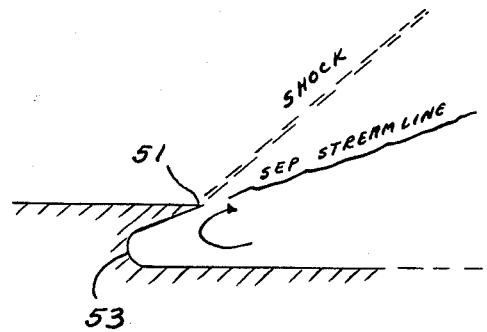
FIG. 14 shows a modification of the device of FIG. 13.

Another method for stabilizing the separation point is shown in FIGS. 13 and 14. The wall may be recessed at the desired separation point, such as at 51 in FIG. 13. The step need be only a few boundary layer thicknesses in height. A cleaner separation may be obtained by undercutting the rear of the step as shown at 53 in FIG. 14.

While the diffuser of the invention was developed for use with a gas dynamic laser, it could also be used in other places where diffusers are normally used, such as in wind tunnels.

There is thus provided a supersonic diffuser which provides better pressure recovery than fixed geometry diffusers, with the moving parts having relatively low mass and which is well suited to high aspect ratio devices such as gas dynamic lasers.

I claim:

1. A variable geometry supersonic diffuser comprising: a multichannel shock duct diffuser having a rectangular shaped flow channel with inner walls forming two outer flow channels and a central flow channel; means for supplying a supersonic flow to said channel upstream of said inner walls; adjustable means adapted to close said two outer flow channels for causing a stable boundary layer flow separation from the wall of the rectangular shaped flow channel and a flow through said central channel; means for fixing the boundary layer separation point of the flow in said rectangular channel and means for stabilizing the flow reattachment to said inner walls.

2. The device as recited in claim 1 wherein said means for fixing the boundary layer separation point comprises retractable wedges positioned upstream of the normal flow separation points.

3. The device as recited in claim 2 wherein said means for stabilizing flow reattachment to said inner walls comprises means on said inner walls forming cusps facing upstream of the flow with the inner surface of said cusps positioned substantially at the same angle to the direction of flow as the outer surfaces of the extended retractable wedges.

4. The device as recited in claim 3 wherein said means adapted to close said two outer channels comprises movable gates passing through the walls of the rectangular channel.

5. The device as recited in claim 3 wherein said means adapted to close said two outer channels comprises movable gates hinged to the walls of said rectangular channel; means, passing through the walls of said rectangular channel, for opening and closing said movable gates.

* * * * *